(12) United States Patent
Ishida et al.

(10) Patent No.: US 11,377,014 B2
(45) Date of Patent: Jul. 5, 2022

(54) RIDING VEHICLE

(71) Applicant: AISIN CORPORATION, Aichi (JP)

(72) Inventors: Toshihiko Ishida, Kariya (JP); Yoshiteru Taniguchi, Kariya (JP); Hideyuki Umehara, Kariya (JP)

(73) Assignee: AISIN CORPORATION, Kariya (JP)

( * ) Notice: Subject to any disclaimer, the term of this patent is extended or adjusted under 35 U.S.C. 154(b) by 256 days.

(21) Appl. No.: 16/853,843

(22) Filed: Apr. 21, 2020

(65) Prior Publication Data

US 2020/0339024 A1 Oct. 29, 2020

(30) Foreign Application Priority Data

Apr. 24, 2019 (JP) .............................. JP2019-083019

(51) Int. Cl.
*B60P 1/64* (2006.01)
*B62K 5/007* (2013.01)

(52) U.S. Cl.
CPC ........... *B60P 1/6409* (2013.01); *B60P 1/6418* (2013.01); *B62K 5/007* (2013.01); *B62K 2202/00* (2013.01)

(58) Field of Classification Search
CPC ...... B60P 1/6409; B60P 1/6418; B62K 5/007; B62K 2202/00; B62K 2204/00; B62K 13/08; B62K 19/44; B62J 1/08; B62J 1/12; B62J 7/02
See application file for complete search history.

(56) References Cited

U.S. PATENT DOCUMENTS

2013/0192908 A1* 8/2013 Schlagheck ............ B62K 3/002
180/65.1

FOREIGN PATENT DOCUMENTS

| CN | 202029972 U | * | 11/2011 | |
| JP | 2005-193740 A | | 7/2005 | |
| WO | WO-2018066542 A1 | * | 4/2018 | ............... B62B 3/00 |

* cited by examiner

*Primary Examiner* — Darlene P Condra
(74) *Attorney, Agent, or Firm* — Oblon, McClelland, Maier & Neustadt, L.L.P.

(57) ABSTRACT

A riding vehicle includes: a main body supporting a wheel and on which a steering stay and a seat stay are erected at an interval in a traveling direction; a handle provided on the steering stay; a pedestal portion fixed to an upper end of the seat stay; a seat rotatably connected to the pedestal portion, and configured to switch between a riding state where the seat stands upright to cover the pedestal portion from above so as to be in an arrangement suitable for riding and a cart state where the seat is inclined in a traveling direction away from the steering stay to open an upper portion of the pedestal portion so as to be in an arrangement suitable for conveyance movement with baggage placed thereon; and a stopper interposed between the pedestal portion and the seat and regulating the seat in the riding and cart states.

6 Claims, 4 Drawing Sheets

RIDING VEHICLE

CROSS REFERENCE TO RELATED APPLICATIONS

This application is based on and claims priority under 35 U.S.C. § 119 to Japanese Patent Application 2019-083019, filed on Apr. 24, 2019, the entire contents of which are incorporated herein by reference.

TECHNICAL FIELD

This disclosure relates to a riding vehicle.

BACKGROUND DISCUSSION

In the related art, a riding vehicle disclosed in, for example, JP-A-2005-193740 (Reference 1) is known. The riding vehicle includes a main body on which a steering stay is erected and supports wheels, a handle provided on the steering stay, a seat stay rotatably connected to the main body, a seat provided at an upper end of the seat stay, and a carrier provided on the seat stay. With the rotation of the seat stay with respect to the main body, for example, the vehicle switches between a riding state in which the seat stay stands upright so that the seat is in an arrangement suitable for riding and a cart state in which the seat stay is inclined and folded so that the carrier is in an arrangement suitable for conveyance movement with baggage placed on the carrier.

A stopper is provided to regulate the seat stay in each of the riding state and the cart state.

Reference 1 discloses a structure in which the seat stay is cantilever-supported with respect to the main body. For this reason, for example, a mass moment of the baggage in the cart state is focused on a rotation shaft portion of the seat stay, and it is necessary to ensure a sufficient strength of the stopper that regulates the cart state.

Thus, a need exists for a riding vehicle which is not susceptible to the drawback mentioned above.

SUMMARY

A riding vehicle according to an aspect of this disclosure includes a main body that supports a wheel and on which a steering stay and a seat stay are erected at an interval in a traveling direction; a handle provided on the steering stay; a pedestal portion fixed to an upper end of the seat stay; a seat that is rotatably connected to the pedestal portion, and is configured to switch between a riding state in which the seat stands upright to cover the pedestal portion from above so as to be in an arrangement suitable for riding and a cart state in which the seat is inclined in a traveling direction away from the steering stay to open an upper portion of the pedestal portion so as to be in an arrangement suitable for conveyance movement with baggage placed on the pedestal portion; and a stopper that is interposed between the pedestal portion and the seat and regulates the seat in the riding state and the cart state.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

One embodiment of a riding vehicle will be described below.

Figure 1:
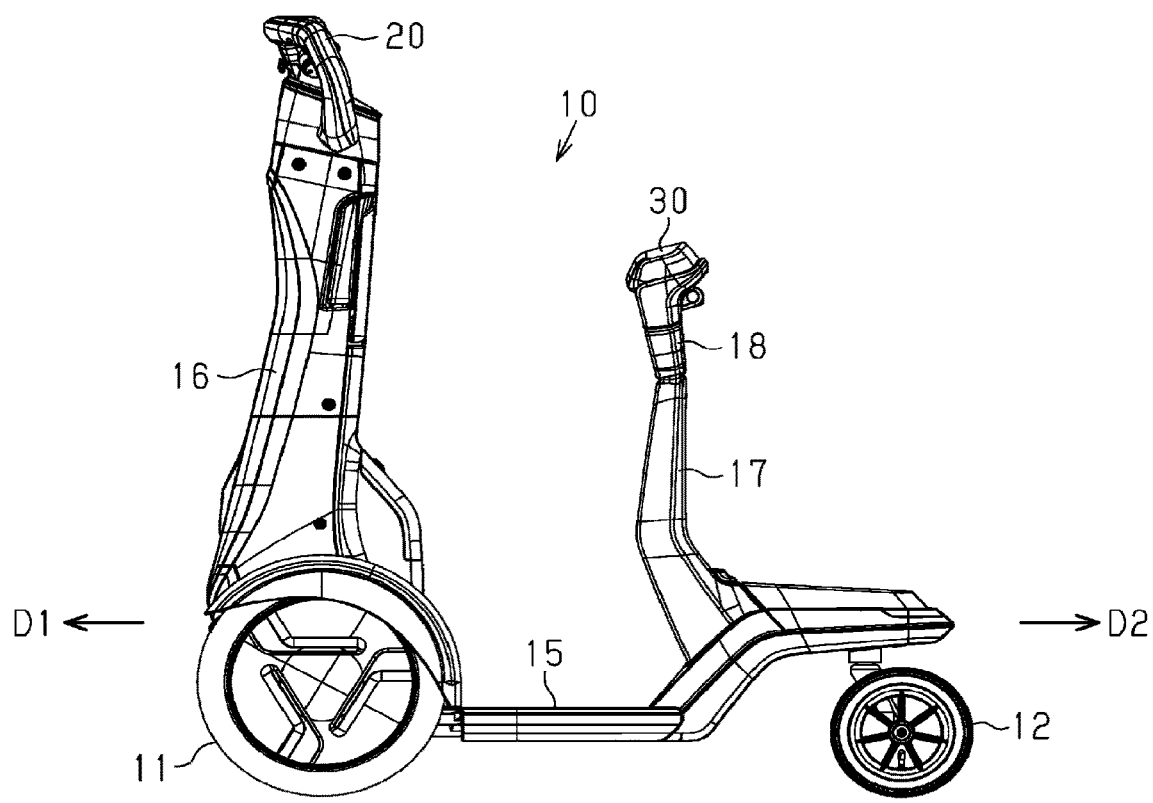
FIG. 1 is a side view showing a structure of a riding vehicle according to an embodiment.
Figure 2:
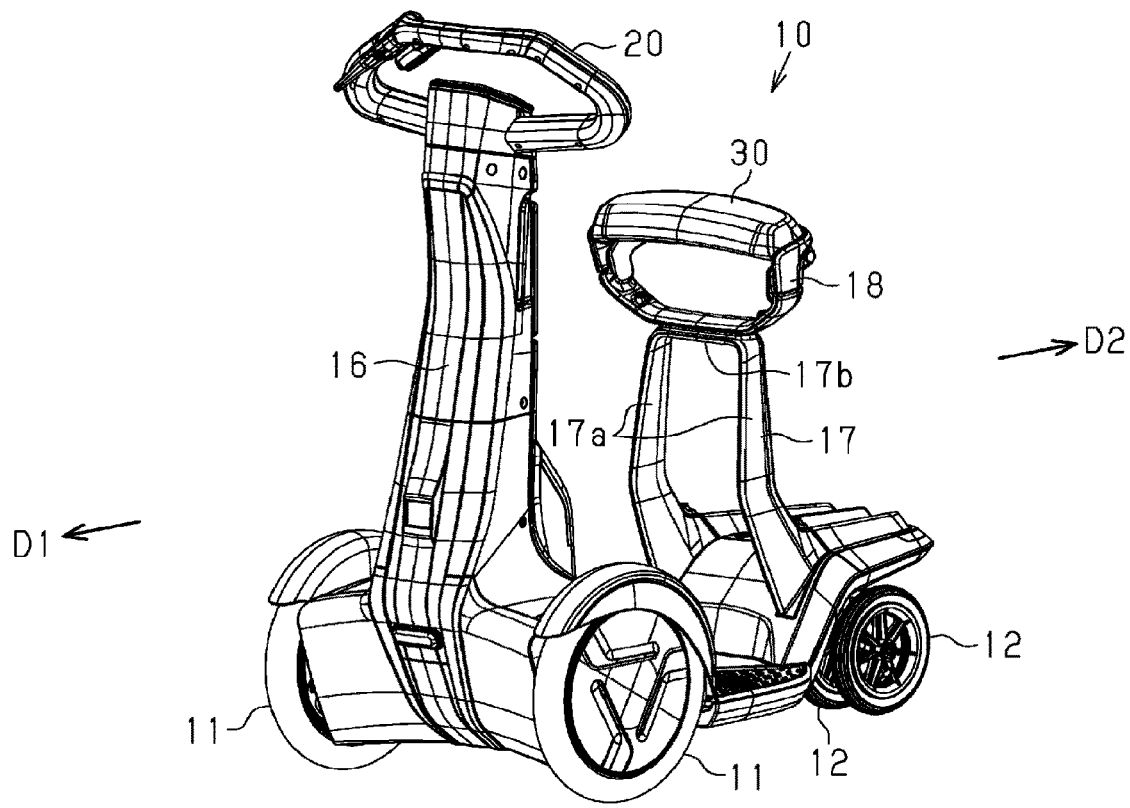
FIG. 2 is a perspective view showing the structure of the riding vehicle according to the embodiment.

As shown in FIGS. 1 and 2, an electric vehicle 10 as the riding vehicle includes driving wheels 11 and driven wheels 12 as wheels arranged at an interval in a traveling direction. The driving wheels 11 and the driven wheels 12 are provided in a pair at an interval in a vehicle width direction. The two driven wheels 12 are arranged approaching to each other in the vehicle width direction and function as substantially one wheel.

The electric vehicle 10 includes a main body 15 that supports the two driving wheels 11 and the two driven wheels 12. A steering stay 16 and a seat stay 17 are erected on the main body 15 at an interval in the traveling direction.

Here, the two driving wheels 11 are individually rotationally driven by a pair of electric motors (not shown). Therefore, the two electric motors are driven to rotate at the same rotation speed with the two driving wheels 11, so that the electric vehicle 10 can travel straight in the travel direction. For example, the electric vehicle 10 travels straight in the traveling direction in which the driving wheels 11 advance ahead of the driven wheels 12 (hereinafter, also referred to as "forward traveling direction D1") by the two electric motors rotating forward at the same rotation speed. On the contrary, the electric vehicle 10 travels straight in the traveling direction in which the driving wheels 11 follow the driven wheels 12 (hereafter, also referred to as "reverse traveling direction D2") by the two electric motors rotating in reverse at the same rotation speed. Further, the electric vehicle 10 can turn in the traveling direction by rotating the two electric motors together with the two driving wheels 11 at different rotation speeds.

Hereinafter, for convenience, the forward traveling direction D1 and the reverse traveling direction D2 will be defined as "front direction" and "rear direction".

The steering stay 16 stands upright at a position of the two driving wheels 11 in the traveling direction, and a loop-shaped handle 20 extending upward and toward both sides in the vehicle width direction is provided on an upper end of the steering stay 16.

The seat stay 17 is formed of, for example, a metal plate and is formed into a substantially U shape. The seat stay 17 includes a pair of substantially arm-shaped vertical wall portions 17a arranged in parallel in the vehicle width direction in a direction of slightly approaching the steering stay 16 from a position of the two driven wheels 12 in the traveling direction, that is, at a position shifted from the position of the two driven wheels 12 in the forward traveling direction D1 and a connection wall portion 17b connecting upper ends of the two vertical wall portions 17a in the vehicle width direction.

Figure 3A:
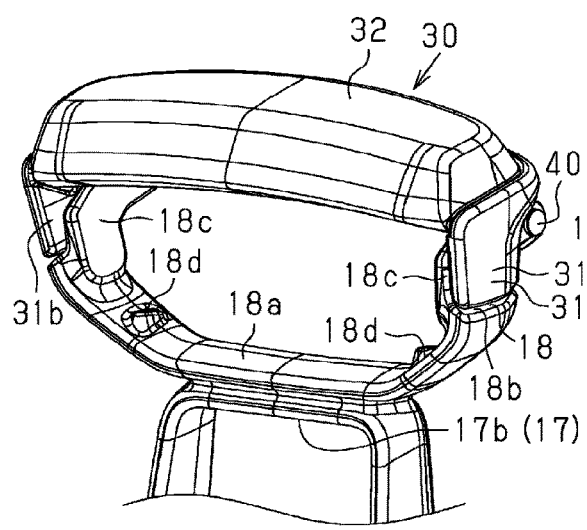
FIGS. 3A and 3B are perspective views showing structures of a seat of the riding vehicle in a riding state and a cart state according to the embodiment.
Figure 3B:
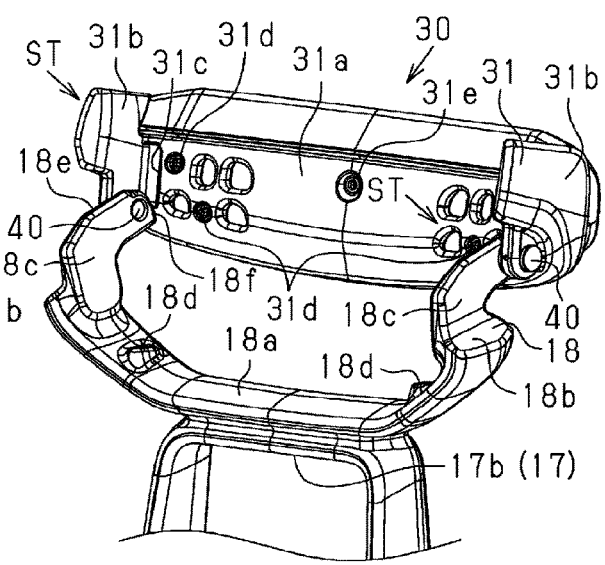

A pedestal portion 18 formed of, for example, a metal plate is fixed to an upper end of the seat stay 17, that is, an upper surface of the connection wall portion 17b. As shown in FIGS. 3A and 3B, the pedestal portion 18 has a substantially arcuate bottom wall portion 18a that extends in the vehicle width direction along the connection wall portion 17b and is fixed to the connection wall portion 17b. A pair of support projections 18d project upward from the bottom wall portion 18a at an interval in the vehicle width direction.

The pedestal portion 18 includes a pair of steps 18b that are connected to both ends of the bottom wall portion 18a in the vehicle width direction and project in the vehicle width direction and a pair of substantially arm-shaped first side holding portions 18c projecting upward from front ends of the two steps 18b. That is, in the vehicle width direction, a separation distance between the two first side holding portions 18c is smaller than a separation distance between both ends of the bottom wall portion 18a by an amount of the two steps 18b. The first side holding portions 18c extends from the steps 18b obliquely upward in a traveling direction away from the steering stay 16, that is, in the reverse traveling direction D2.

A seat 30 is rotatably connected to the pedestal portion 18. That is, the seat 30 includes a seat frame 31 formed of, for example, a metal plate. The seat frame 31 includes a top plate portion 31a extending in the vehicle width direction and a pair of second side holding portions 31b projecting downward from both ends of the top plate portion 31a in the vehicle width direction, and is formed into a substantially U shape.

A pair of upper and lower mass reduction holes 31d are formed at both ends of the top plate portion 31a in the vehicle width direction. The mass reduction holes 31d are to reduce the weight of the electric vehicle 10. A substantially circular screw hole 31e is formed at the center of the top plate portion 31a in the vehicle width direction.

The two second side holding portions 31b are overlapped with the two first side holding portions 18c on both outer sides of the two first side holding portions 18c in the vehicle width direction. The seat frame 31 is rotatably connected to the pedestal portion 18 about an axis extending in the vehicle width direction by support pins 40 that penetrate front end portions of the first side holding portions 18c and the second side holding portions 31b adjacent to each other in the vehicle width direction.

Here, when the seat frame 31 rotates around the two support pins 40 in a counterclockwise direction in the drawing, the seat frame 31 is stopped from rotating by an opposite surface of the top plate portion 31a (hereinafter, referred to as "stopper portion 31c") abutting on upper surfaces of the first side holding portions 18c (hereinafter, referred to as "riding state stopper portion 18e"). At this time, the top plate portion 31a extends substantially horizontally, and the second side holding portions 31b are substantially flush with side portions of the bottom wall portion 18a by being settled within a range of the steps 18b in the vehicle width direction. Such a state of the seat 30 is referred to as a "riding state". The seat 30 in the riding state stands upright to cover the pedestal portion 18 from above so as to be in an arrangement suitable for riding.

On the other hand, when the seat frame 31 rotates around the two support pins 40 in a clockwise direction in the drawing, the seat frame 31 is stopped from rotating by the stopper portion 31c of the top plate portion 31a abutting on rear end surfaces of the first side holding portions 18c (hereinafter, referred to as "cart state stopper 18f"). At this time, the top plate portion 31a extends substantially perpendicularly, and the second side holding portions 31b are arranged above the first side holding portions 18c. Such a state of the seat 30 is referred to as a "cart state". The seat 30 in the cart state is inclined rearward to open an upper portion of the pedestal portion 18 so as to be in an arrangement suitable for conveyance movement with baggage placed on the pedestal portion 18. In the cart state, for example, appropriate baggage placed on the pedestal portion 18 in a manner of being in contact with the two support projections 18d is regulated from moving in the vehicle width direction by cooperation of the two first side holding portions 18c and the two second side holding portions 31b, and is regulated from moving rearward by the top plate portion 31a.

The riding state stopper portion 18e, the cart state stopper portion 18f, and the stopper portion 31c constitute a stopper ST.

The seat 30 includes a seating portion 32 placed on the top plate portion 31a. The seating portion 32 extends in the vehicle width direction on the top plate portion 31a, and is fastened to the top plate portion 31a by a screw inserted into the screw hole 31e. The seating portion 32 is preferably a cushion (an elastically deformable material). However, the seating portion 32 may also be a rigid body such as a resin or a metal.

Figure 4A:
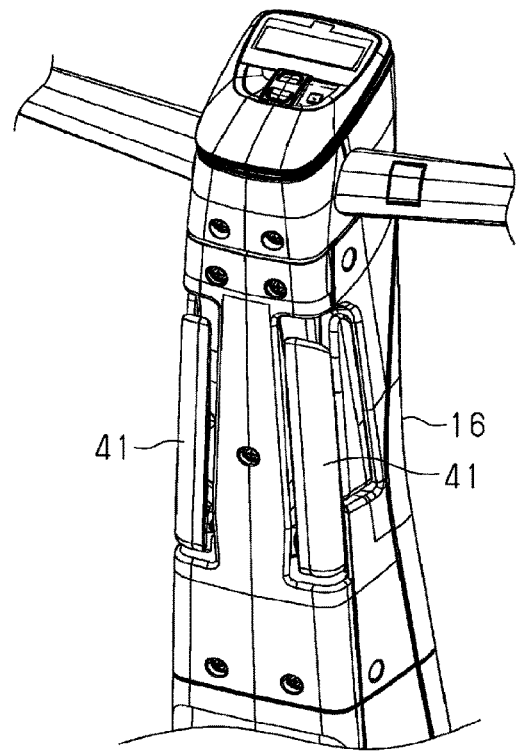
FIGS. 4A and 4B are perspective views showing structures of holding projections of the riding vehicle in a storage state and an expanded state according to the embodiment.
Figure 4B:
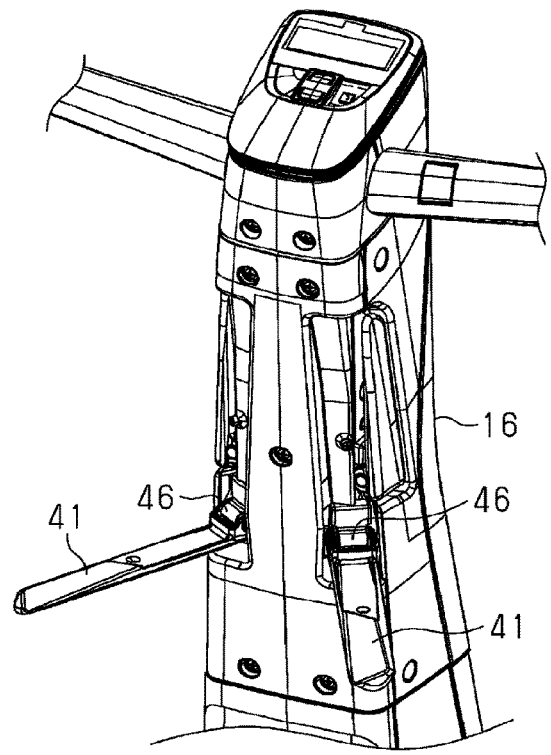

As shown in FIGS. 4A and 4B, a pair of substantially arm-shaped holding projections 41 arranged in parallel in the vehicle width direction are rotatably connected to an upper end portion of the steering stay 16. The two holding projections 41 are allowed to rotate in a range from a rotation position of standing upward along the steering stay 16 (hereinafter, referred to as a "storage state") to a rotation position of projecting obliquely rearward in directions opposite to each other in the vehicle width direction (hereinafter, referred to as "expanded state"). The projecting directions are orthogonal to the steering stay 16.

Figure 5:
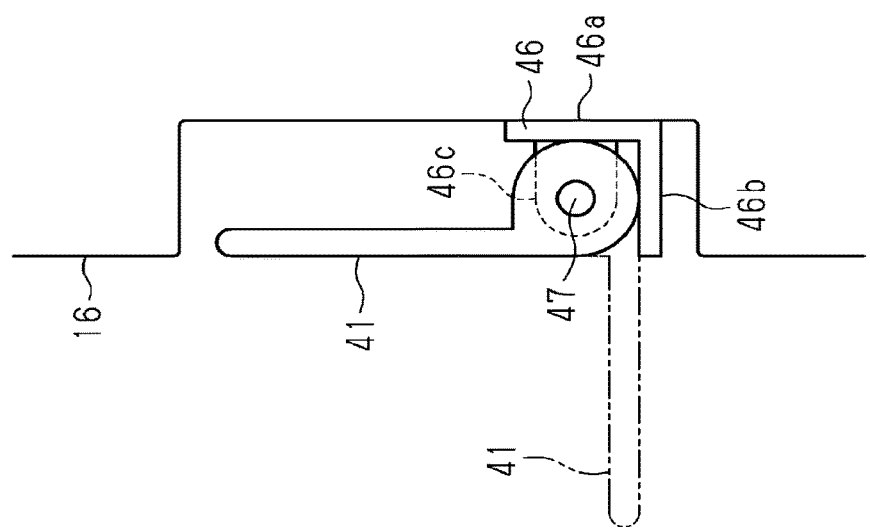
FIG. 5 is a side view schematically showing a structure and an action of the holding projection of the riding vehicle according to the embodiment.

That is, as shown in FIG. 5, for example, a bracket 46 formed of metal is fixed to the steering stay 16. The bracket 46 integrally includes a base portion 46a fixed to the steering stay 16, a regulation sheet 46b projecting obliquely rearward in the vehicle width direction from a lower end of the base portion 46a, and a substantially disk-shaped support portion 46c projecting from the base portion 46a substantially in parallel with the regulation sheet 46b above the regulation sheet 46b. The holding projection 41 is rotatably connected to the steering stay 16 via the bracket 46 by a shaft 47 penetrating a lower end of the holding projection 41 and the support portion 46c.

The holding projection 41 that stands upright along the steering stay 16 is attracted to a magnet (not shown) provided in the steering stay 16 to maintain the storage state. On the other hand, the holding projection 41 rotated counterclockwise in the drawing around the shaft 47 is regulated from rotating by the contact with the regulation sheet 46b, thereby maintaining the expanded state.

Here, as shown in FIGS. 1 and 2, in the riding state of the seat 30, an occupant sits on the seat 30 facing the forward traveling direction D1, grips the handle 20, and takes a posture in which soles of both feet are placed on the main body 15. Accordingly, the occupant can electrically move the electric vehicle 10 while sitting on the electric vehicle 10. It goes without saying that the traveling direction of the electric vehicle 10 is basically the forward traveling direction D1, that is, the front direction.

Figure 6:
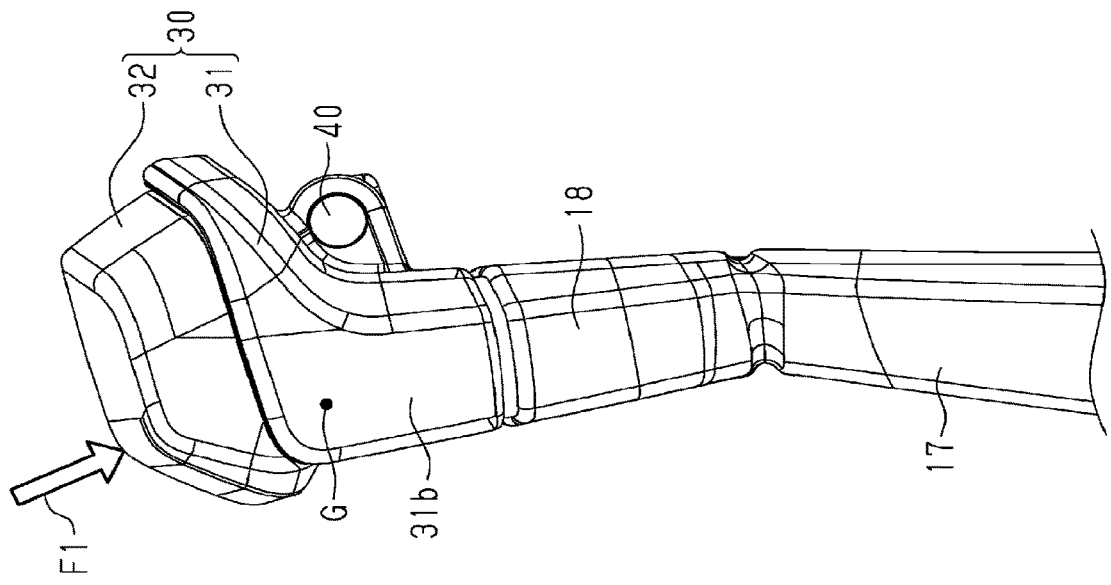
FIG. 6 is a side view showing a relationship between a direction of a seating load of an occupant relative to the seat and a support pin in the riding vehicle according to the embodiment.

As shown in FIG. 6, in the riding state of the seat 30, the occupant sits on a front upper end of the seating portion 32 located obliquely forward and upward relative to the support pin 40. A direction F1 of a seating load of the occupant relative to the seat 30 extends rearward and obliquely downward in front of the support pins 40. That is, the direction F1 of the seating load generates a moment of force in a direction in which the stopper ST regulates the seat 30 in the riding state.

Further, in the riding state, the two second side holding portions 31*b* project to the front direction so that the center of gravity G of the seat 30 is located forward of the support pin 40. Therefore, in the riding state of the seat 30, a direction of the load by the seat 30 alone also generates a moment of force in the direction in which the stopper ST regulates the seat 30 in the riding state.

Figure 7:
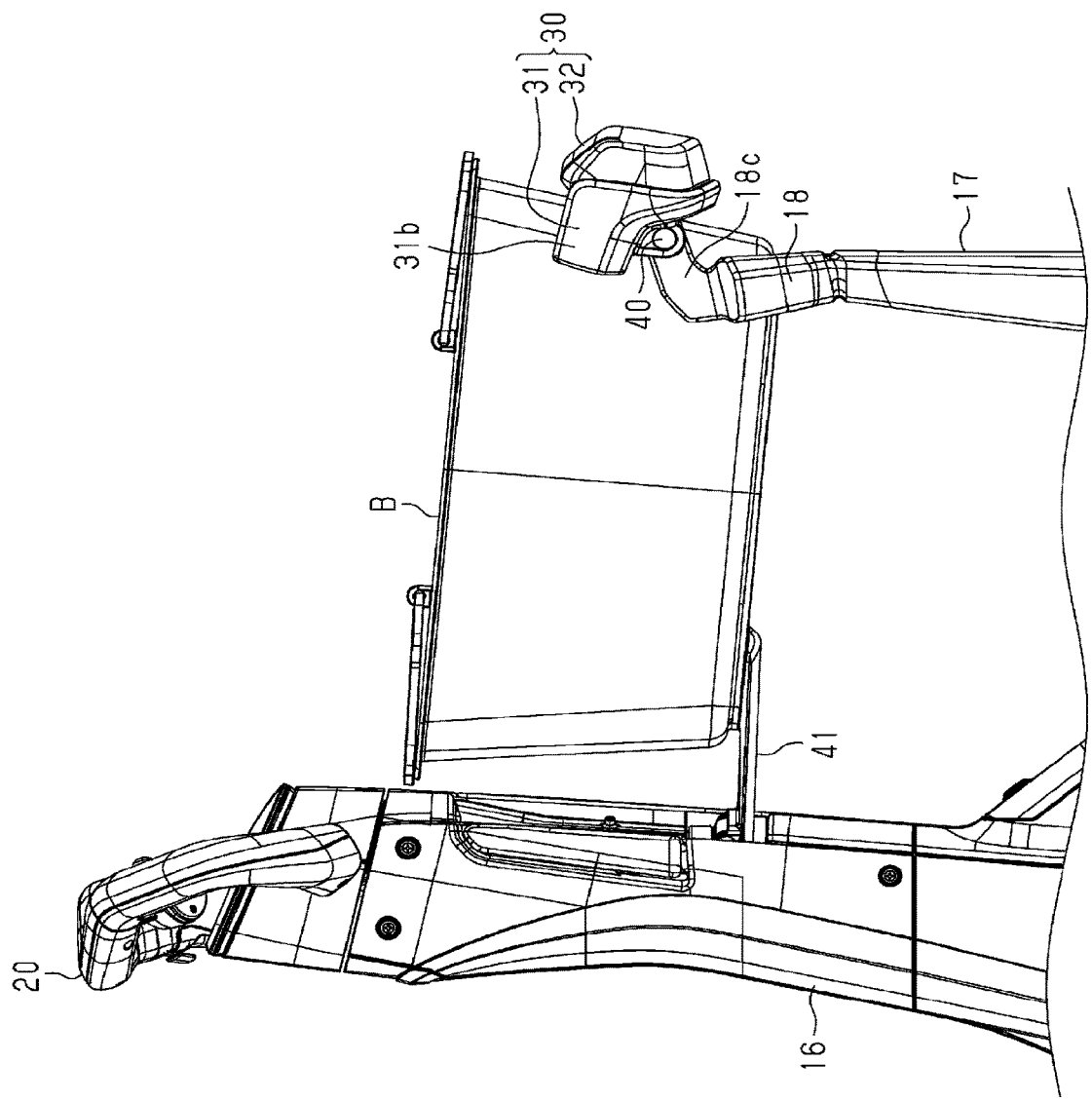
FIG. 7 is a side view showing a holding state of baggage in the riding vehicle according to the embodiment.

As shown in FIG. 7, when the seat 30 is in the cart state and the two holding projections 41 are in the expanded state, for example, a front end portion and a rear end portion of baggage B such as a basket including stored items are placed on the two holding projections 41 and the pedestal portion 18 (two support projections 18*d*). At this time, a lower end portion of the baggage B is sandwiched in the vehicle width direction by the two first side holding portions 18*c*, and is sandwiched in the vehicle width direction by the two second side holding portions 31*b* above the two first side holding portions 18*c*, so that a movement in the vehicle width direction is regulated. In particular, since the two second side holding portions 31*b* are arranged on the outer sides of the two first side holding portions 18*c* in the vehicle width direction, the movement in the vehicle width direction is suitably regulated corresponding to a shape of the basket that is expanded upward.

In addition, the baggage B is regulated from moving in a front-rear direction by approaching the steering stay 16 to the front direction and approaching the top plate portion 31*a* (see FIG. 3) of the seat frame 31 to the rear direction.

When the electric vehicle 10 is in such a state, a user such as the occupant takes a posture of standing facing the reverse traveling direction D2 at a position on the forward traveling direction D1 side relative to the electric vehicle 10 and gripping the handle 20. Accordingly, the user can manually or electrically move the baggage B in a state where the baggage B is placed on the electric vehicle 10. It goes without saying that the traveling direction of the electric vehicle 10 is basically the reverse traveling direction D2, that is, the rear direction.

Operation and effects of the present embodiment will be described.

(1) In the present embodiment, for example, the weight of the baggage B placed on the pedestal portion 18 in the cart state is supported by the seat stay 17 erected on the main body portion 15 from directly above. Therefore, it is possible to reduce the distribution of the strength due to the load and burden on the support structure. On the other hand, the stopper ST that regulates the seat 30 in the cart state is not required to support the weight of the baggage B. Accordingly, it is not necessary to use a structure in which a moment of force is applied by the weight of the baggage B placed on the pedestal portion 18, and it is sufficient for the seat 30 in the cart state to be capable of regulating the backward movement of the baggage B. Therefore, the strength required for the stopper ST that regulates the cart state can be further reduced. As a result, a product cost and manufacturing cost of the stopper ST can be further reduced.

(2) In the present embodiment, for example, a load direction when the occupant sits or leans on the seat 30, that is, the direction F1 of the seating load of the occupant relative to the seat 30 in the riding state is set such that the stopper ST generates a moment of force in the direction of regulating the seat 30 in the riding state. That is, the direction F1 of the seating load of the occupant is set such that the seating load does not act in a rotation direction around the support pin 40 that lifts up the seat 30. Therefore, in a state where the occupant sits on the seat 30, a moment of force acts such that the stopper ST regulates the seat 30 in the riding state. Therefore, in the state where the occupant sits on the seat 30, it is possible to prevent the seat 30 from being inadvertently rotated to the cart state.

Further, in the riding state, since the two second side holding portions 31*b* project to the front direction, the center of gravity G of the seat 30 is located forward of a rotation center. That is, the direction of the load by the seat 30 alone in the riding state generates a moment of force in a direction in which the stopper ST regulates the seat 30 in the riding state. Therefore, even in the state of the seat 30 alone, it is possible to prevent the seat 30 from being inadvertently rotated to the cart state. In other words, the two second side holding portions 31*b* that hold the baggage B in the vehicle width direction are used to adjust the center of gravity G that prevents inadvertent rotation by the seat 30 alone.

(3) In the present embodiment, the pedestal portion 18 includes the bottom wall portion 18*a* fixed to the upper end of the seat stay 17 and the pair of first side holding portions 18*c* projecting upward from the both ends of the bottom wall portion 18*a* in the vehicle width direction. The seat 30 includes the seat frame 31 having the top plate portion 31*a* and the pair of second side holding portions 31*b* projecting downward from the both ends of the top plate portion 31*a* in the vehicle width direction and rotatably connected to the two first side holding portions 18*c* at the both outer sides of the two first side holding portions 18*c* in the vehicle width direction, and the seating portion 32 mounted on the top plate portion 31*a*. In the cart state, the movement of the baggage B placed on the bottom wall portion 18*a* due to swing in the vehicle width direction or the like is regulated by the cooperation of the two first side holding portions 18*c* and the two second side holding portions 31*b*, so that the conveyance movement of the baggage B can be performed more stably.

(4) In the present embodiment, the holding projections 41 that hold the other end portion of the baggage B having one end portion placed on the pedestal portion 18 in the cart state project from the steering stay 16. Therefore, the weight of the baggage B can be supported by the pedestal portion 18 and the holding projections 41, that is, by being distributed in the front-rear direction by the steering stay 16 and the seat stay 17.

(5) In the present embodiment, the holding projections 41 are rotatably connected to the steering stay 16 and are configured to switch between the storage state in which the holding projections 41 stand upright along the steering stay 16 and the expanded state in which the holding projections 41 project rearward so as to place the other end portion of the baggage B thereon.

Therefore, in the riding state, by switching the holding projections 41 to the storage state, it is possible to prevent the occupant from being bothered by the holding projections 41 during riding. Further, in a state in which the baggage B is not conveyed or the like, the design of the electric vehicle 10 as a whole can be improved by switching the holding projections 41 to the storage state.

(6) In the present embodiment, a plurality of holding projections 41 are provided. Therefore, the weight of the baggage B at the other end portion can be further distributed and supported by the plurality of holding projections 41. Since the strength required for one holding projection 41 can be reduced, the structure can be further simplified.

(7) In the present embodiment, by distributing the weight of the baggage B across two structures integrally fixed to the electric vehicle 10, individual structures can be further simplified. Further, one side of the two structures adopts a support structure in which a load in a compression direction is applied from above and the load of the baggage B is distributed comfortably, and the other side adopts a support structure in which a load is applied and distributed by the two holding projections 41 switched to the expanded state. In this way, by adopting a structure as a whole in which the weight of the baggage B can be distributed, the baggage B can be conveyed simply and at low cost.

(8) In the present embodiment, the stopper ST can be constituted by a simple structure including the riding state stopper portion 18e and the cart state stopper portion 18f of the pedestal portion 18 formed of a metal plate and the stopper portion 31c of the seat frame 31 formed of a metal plate. Then, by merely bringing the stopper portion 31c into contact with the riding state stopper portion 18e and the cart state stopper portion 18f, the seat 30 can be regulated to the riding state and the cart state, respectively.

In particular, by optimizing a positional relationship between the direction F1 of the seating load of the occupant relative to the seat 30 in the riding state and a support and rotation shaft, that is, the support pin 40, the position in the riding state can be naturally maintained, and the seat 30 may be simply rotated when switching to the cart state.

As described above, when switching from one of the riding state and the cart state to the other, it is possible to eliminate the trouble of, for example, releasing regulation or confirming a function of the regulation state after switching.

(9) In the present embodiment, the holding projections 41 that hold the front end portion of the baggage B are rotatably connected to the brackets 46 integrally fixed to the steering stay 16. Therefore, the holding projections 41 can be switched between the storage state and the expanded state by simple operation.

(10) In the present embodiment, the two holding projections 41 project obliquely rearward in directions opposite to each other in the vehicle width direction in the expanded state, so that a substantial range in the vehicle width direction for holding the front end portion of the baggage B can be increased. Even if the size of each holding projection 41 is not necessarily increased, the front end portion of the baggage B can be held in a more stable state.

(11) In the present embodiment, for example, since there is no need for a stopper having a complicated structure for regulating the seat 30 to the riding state or the cart state, product cost and manufacturing man-hours can be reduced.

The present embodiment can be modified and implemented as follows. The present embodiment and the following modifications can be implemented in combination with each other without technical contradiction.

In the above embodiment, the holding projections 41 may be switched to the expanded state while the seat 30 is in the riding state. In this case, when the occupant moves while sitting on the electric vehicle 10, the holding projections 41 can be used as a hook for hooking a shopping bag such as a so-called plastic bag.

In the above embodiment, the number of the holding projections 41 may be one, or three or more. Further, the holding projections 41 in the expanded state may project straight rearward without being inclined in the vehicle width direction.

In the above embodiment, the holding projections 41 may be fixed to the steering stay 16 so as to always project rearward. In this case, a projection length of the holding projections 41 may be reduced, and a flange formed at an opening of the baggage B (basket) may be hooked on the holding projections 41. By holding the baggage B in this manner, even if the holding projections 41 become relatively small, stable conveyance can be implemented.

In the above embodiment, the holding projections 41 may be omitted. In other words, baggage related to the conveyance movement may be placed on the pedestal portion 18 only.

In the above embodiment, the two steps 18b of the pedestal portion 18 may be omitted. That is, the two first side holding portions 18c may be directly connected to both ends of the bottom wall portion 18a in the vehicle width direction. The two steps 18b of the pedestal portion 18 and the two first side holding portions 18c may be omitted. That is, the movement of the baggage placed on the bottom wall portion 18a in the vehicle width direction does not need to be regulated by the two first side holding portions 18c. In this case, the pedestal portion 18 may be rotatably connected to, for example, the seat frame 31 at the rear end of the bottom wall portions 18a.

In the above embodiment, the two second side holding portions 31b of the seat frame 31 may be rotatably connected to the two first side holding portions 18c on both inner sides of the two first side holding portions 18c in the vehicle width direction. In addition, the two second side holding portions 31b of the seat frame 31 may be omitted. That is, the movement of the baggage placed on the bottom wall portion 18a in the vehicle width direction does not need to be regulated by the two second side holding portion 31b. In this case, the seat frame 31 may be rotatably connected to, for example, the pedestal portion 18 at the rear end of the top plate portion 31a.

In the above embodiment, the direction of the seating load of the occupant relative to the seat 30 in the riding state may not be set such that the stopper ST generates a moment of force in the direction of regulating the seat 30 in the riding state.

In the above embodiment, an appropriate driving device that transmits operating force of a foot or the like to the driving wheels 11 may be installed so that the vehicle can be moved by human power even when the occupant sits on the electric vehicle 10.

A riding vehicle according to an aspect of this disclosure includes a main body that supports a wheel and on which a steering stay and a seat stay are erected at an interval in a traveling direction; a handle provided on the steering stay; a pedestal portion fixed to an upper end of the seat stay; a seat that is rotatably connected to the pedestal portion, and is configured to switch between a riding state in which the seat stands upright to cover the pedestal portion from above so as to be in an arrangement suitable for riding and a cart state in which the seat is inclined in a traveling direction away from the steering stay to open an upper portion of the pedestal portion so as to be in an arrangement suitable for conveyance movement with baggage placed on the pedestal portion; and a stopper that is interposed between the pedestal portion and the seat and regulates the seat in the riding state and the cart state.

According to the configuration, for example, a weight of the baggage placed on the pedestal portion in the cart state is supported by the seat stay erected on the main body from directly above. On the other hand, the stopper that regulates the seat in the cart state is not a structure in which a moment of force is applied by the weight of the baggage placed on the pedestal portion, but may be any structure as long as the seat in the cart state can regulate a movement of the baggage in a traveling direction away from the steering stay. Therefore, it is possible to further reduce the strength required for the stopper that regulates the cart state.

In the riding vehicle, it is preferable that a direction of a seating load of an occupant relative to the seat in the riding state is set such that the stopper generates a moment of force in a direction of regulating the seat in the riding state.

According to the configuration, in a state in which the occupant sits on the seat, the moment of force acts such that the stopper regulates the seat in the riding state. Therefore, in the state in which the occupant sits on the seat, it is possible to prevent the seat from being inadvertently rotated to the cart state.

In the driving vehicle, it is preferable that the pedestal portion includes a bottom wall portion fixed to the upper end of the seat stay and a pair of first side holding portions projecting upward from both ends of the bottom wall portion in a vehicle width direction. The seat includes a seat frame including a top plate portion and a pair of second side holding portions projecting downward from both ends of the top plate portion in the vehicle width direction and rotatably connected to the two first side holding portions on both outer sides of the two first side holding portions in the vehicle width direction, and a seating portion mounted on the top plate portion. In the cart state, a movement of the baggage placed on the bottom wall portion in the vehicle width direction is regulated by cooperation of the two first side holding portions and the two second side holding portions.

According to the configuration, in the cart state, by regulating the movement of the baggage placed on the bottom wall portion in the vehicle width direction by the cooperation of the two first side holding portions and the two second side holding portions, it is possible to more stably perform conveyance movement of the baggage.

It is preferable that the riding vehicle further includes a holding projection that projects from the steering stay in the traveling direction approaching the seat stay and holds the other end portion of the baggage having one end portion placed on the pedestal portion in the cart state.

According to the configuration, the weight of the baggage can be distributed and supported in the traveling direction by the pedestal portion and the holding projection, that is, by the seat stay and the steering stay.

In the riding vehicle, it is preferable that the holding projection is rotatably connected to the steering stay, and is configured to switch between a storage state in which the holding projection stands upright along the steering stay and an expanded state in which the holding projection projects in the traveling direction approaching the seat stay so that the other end portion of the baggage is placed thereon.

According to the configuration, by switching the holding projection to the storage state in the riding state, it is possible to prevent the occupant from being bothered by the holding projection during riding.

In the riding vehicle, it is preferable that the plurality of holding projections are provided.

According to the configuration, the weight of the baggage at the other end portion can be further distributed and supported by the plurality of holding projections.

This disclosure has an effect of further reducing the strength required for the stopper that regulates the cart state.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A riding vehicle comprising:
   a main body that supports a wheel and on which a steering stay and a seat stay are erected at an interval in a traveling direction;
   a handle provided on the steering stay;
   a pedestal portion fixed to an upper end of the seat stay;
   a seat that is rotatably connected to the pedestal portion, and is configured to switch between a riding state in which the seat stands upright to cover the pedestal portion from above so as to be in an arrangement suitable for riding and a cart state in which the seat is inclined in a traveling direction away from the steering stay to open an upper portion of the pedestal portion so as to be in an arrangement suitable for conveyance movement with baggage placed on the pedestal portion; and
   a stopper that is interposed between the pedestal portion and the seat and regulates the seat in the riding state and the cart state.

2. The riding vehicle according to claim 1, wherein a direction of a seating load of an occupant relative to the seat in the riding state is set such that the stopper generates a moment of force in a direction of regulating the seat in the riding state.

3. The riding vehicle according to claim 1, wherein the pedestal portion includes a bottom wall portion fixed to the upper end of the seat stay and a pair of first side holding portions projecting upward from both ends of the bottom wall portion in a vehicle width direction, the seat includes:
   a seat frame including a top plate portion and a pair of second side holding portions projecting downward from both ends of the top plate portion in the vehicle width direction and rotatably connected to the two first side holding portions on both outer sides of the two first side holding portions in the vehicle width direction, and
   a seating portion mounted on the top plate portion, and
   in the cart state, a movement of the baggage placed on the bottom wall portion in the vehicle width direction is regulated by cooperation of the two first side holding portions and the two second side holding portions.

4. The riding vehicle according to claim 1, further comprising:
   a holding projection that projects from the steering stay in the traveling direction approaching the seat stay and holds the other end portion of the baggage having one end portion placed on the pedestal portion in the cart state.

5. The riding vehicle according to claim 4, wherein the holding projection is rotatably connected to the steering stay, and is configured to switch between a storage state in which the holding projection stands upright along the steering stay and an expanded state in which the holding projection projects in the traveling direction approaching the seat stay so that the other end portion of the baggage is placed thereon.

6. The riding vehicle according to claim 4, wherein a plurality of holding projections are provided.

* * * * *